May 15, 1928.  1,669,968
J. H. O. BUNGE
GLASS FURNACE AND LEER
Filed May 11, 1925   2 Sheets-Sheet 1
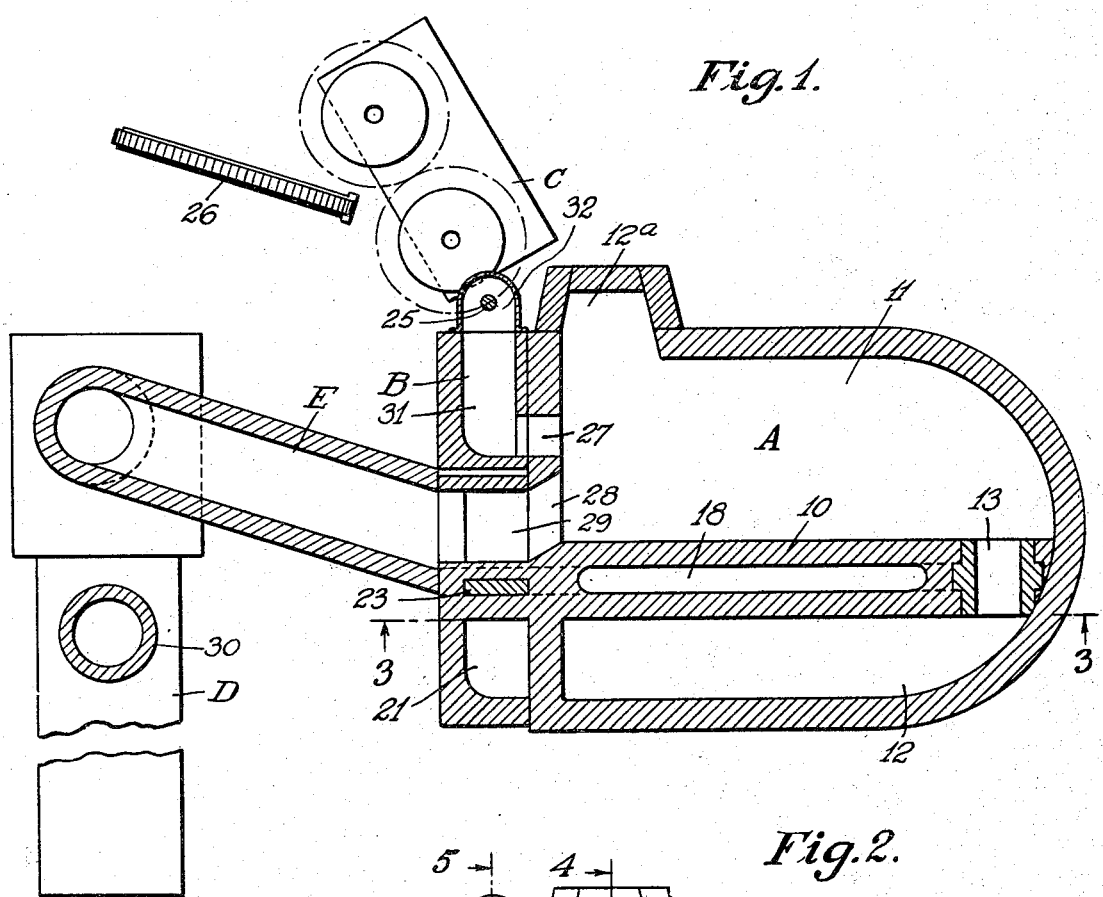
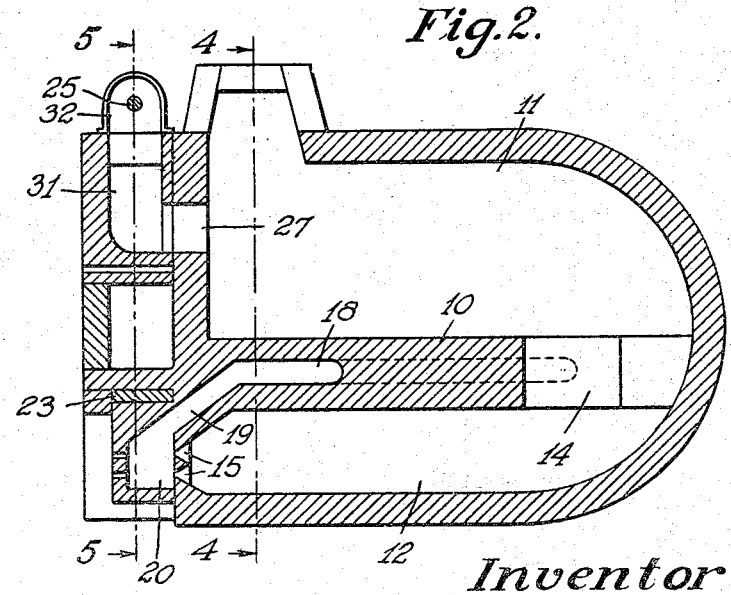
Inventor
Julius H.O.Bunge
by Robson D Brown
Attorney.

May 15, 1928.

J. H. O. BUNGE 1,669,968

GLASS FURNACE AND LEER

Filed May 11, 1925

Inventor
Julius H. O. Bunge
by Robin D. Brown
Attorney.

Patented May 15, 1928.

1,669,968

UNITED STATES PATENT OFFICE.

JULIUS H. O. BUNGE, OF LONDON, ENGLAND, ASSIGNOR TO HARTFORD-EMPIRE COMPANY, OF HARTFORD, CONNECTICUT, A CORPORATION OF DELAWARE.

GLASS FURNACE AND LEER.

Application filed May 11, 1925. Serial No. 29,343.

My invention relates to glass working apparatus and it has special reference to the heating arrangements for glass melting furnaces, feeders and leers.

One object of my invention is to improve and simplify the heating of glass furnaces and leers by employing a common source of heat for heating the furnace and the leer which is commonly employed for annealing the articles of glassware fabricated from glass produced by said furnace. More specifically, I heat the leer by means of the hot combustion gases which heat the furnace and which, ordinarily, are wasted. Also, I preferably employ a regulated portion of these combustion gases for heating a glass feeder associated with the furnace.

Another object of my invention is to provide an improved means for heating glass furnaces by means of fluid-fuel burners, whereby the air necessary for combustion shall be preheated by passing through the interior of the furnace before being supplied to the burner.

As will be more fully explained below, my invention contemplates the provision of a glass furnace having a melting portion and a refining portion separated by a bridge wall, one or more fluid-fuel burners arranged to project flame into the refining portion of the furnace, passages in the bridge wall through which the air for combustion is conducted for preheating before being supplied to the burners, a feeder arranged to receive glass from the furnace and to deliver the glass to a suitable glassware forming machine, a leer for annealing the glassware produced by the forming machine, and channels for conducting hot gases from the furnace to the feeder and to the heating passages of the leer. The leer may be provided with a stack for inducing the circulation of the hot gases from the burner through the furnace and through the leer.

The accompanying drawing shows, in a somewhat diagrammatic manner, the essential parts of a system of apparatus constructed in accordance with my invention. In the drawing;

Figure 1 is a horizontal sectional view of the entire installation, the section being taken substantially on the line 1—1, Fig. 3;

Fig. 2 is a horizontal sectional view of the glass furnace, the section being taken substantially on the line 2—2, Fig. 5;

Figure 3:
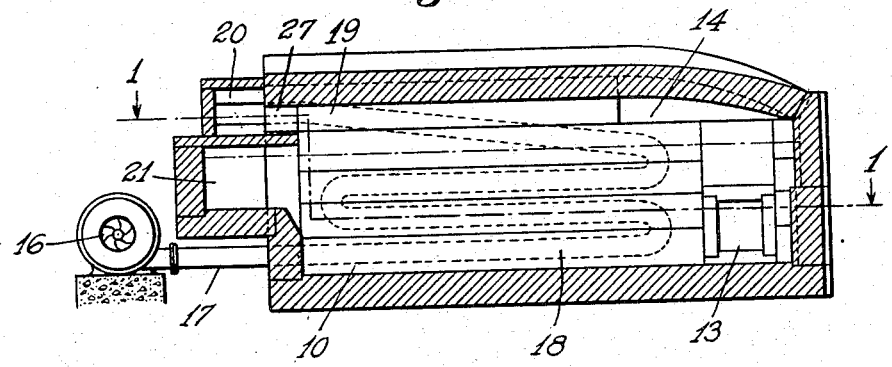
Fig. 3 is a longitudinal vertical sectional view through the furnace, the section being taken substantially on the line 3—3, Fig. 1.
Figure 4:
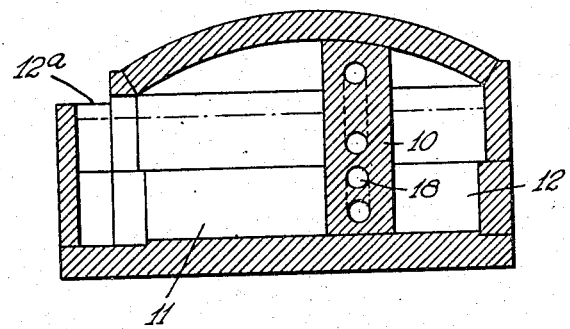
Fig. 4 is a transverse vertical sectional view of the furnace, the section being taken substantially on the line 4—4, Fig. 2.

The system illustrated in the drawing includes a glass furnace A, delivering glass to a feeder B, a glassware forming machine indicated diagrammatically at C, a leer D for annealing the glassware produced by the machine C, and a channel E for conducting hot gases from the furnace A to the leer D.

The furnace A selected for the purpose of illustrating my invention is a comparatively small furnace heated by oil burners. The furnace is divided by a bridge wall 10 into a melting chamber 11 and a refining chamber 12, the melting chamber 11 being provided with the usual means, indicated conventionally by an opening $12^a$, for charging batch into the furnace. The melting and refining compartments of the furnace are connected below the glass line by an opening 13. Above the opening 13 is another opening 14 (Fig. 3) which places the two portions 11 and 12 of the furnace in communication above the glass line.

Figure 5:
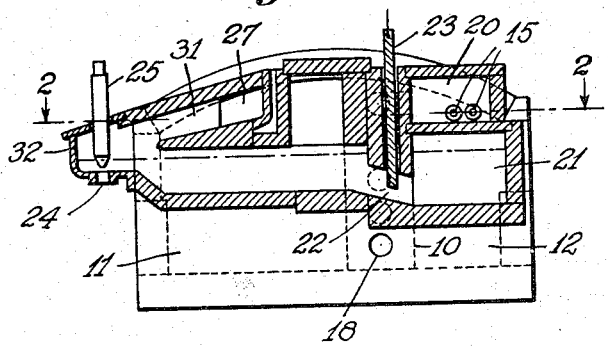
Fig. 5 is a transverse sectional view through the feeder and a portion of the furnace, the section being taken substantially on the line 5—5, Fig. 2.

The furnace A is heated by means of one or more burners discharging through openings 15, Figs. 2 and 5, which project flame into the portion 12 of the furnace, from left to right, as seen in Fig. 2. Air for combustion is supplied to the burners by means of a blower 16, Fig. 3, which forces air through a pipe 17 and through a tortuous passage 18 formed in the bridge wall 10 and preferably distributed over the full depth of the bridge wall. The upper portion of the passage 18, as shown in Fig. 2, communicates through an inclined channel 19 with a combustion box 20. It will be evident that the air, in traversing the passage 18, is preheated before being delivered to the burners. It will also be noted that the hot gases delivered by the burners move along the surface of the glass in the furnace in a direction counter to the direction in which the glass flows through the furnace.

The glass from the refining portion 12 of the furnace is conducted through a passage 21 beneath the burner chamber 20, Figs. 2 and 5, and through an upwardly inclined passage 22 controlled by a gate 23, into the feeder B from which it is discharged to the molds of the forming machine C through an outlet 24 which may be controlled in any usual or desired manner, as by means of a plunger which is shown conventionally at 25.

The specific mechanism by which the forming machine C shapes the glassware is not material to my present invention, and is, therefore, not illustrated in detail. The glassware may be delivered from the forming machine to a conveyor or buck 26, from which it may be transported manually or by any suitable mechanism to the leer D; or the glassware may be taken directly from the forming machine C to the leer D, without the use of the preliminary conveyor 26.

A part of the hot gases from the portion 11 of the furnace A, is conducted through a port 27, Fig. 1, into the interior of the feeder B. Another and larger portion of these hot gases is conducted through a port 28, Fig. 1, and through a chamber 29 into the channel E and thence to the leer D. These hot gases may be caused to traverse the annealing chamber of the leer, or, if the leer is of the muffle type, may be conducted through suitable flues adjacent to the annealing chamber. In either event, the leer is preferably provided with a stack 30, which establishes a draft for maintaining a constant flow of hot gases from the burners through the glass furnace and the feeder, and through the heating passages of the leer.

The hot gases delivered to the feeder through the port 27 move downwardly and forwardly, in a channel 31 within the feeder, to the discharge chamber or feeder forehearth 32 in which the plunger 25 is mounted. The gases then pass rearwardly above the glass in the feeder to the chamber 29, where they combine with the gases issuing from the port 28 and thence pass to the leer. The effective area of the port 27 may be controlled by a suitable damper for regulating the quantity of hot gases delivered to the feeder.

Numerous structural features incident to the furnace and the leer have been omitted from the drawing, which, as stated above, is to be understood as being largely diagrammatic. It will also be understood that various changes in the construction and arrangement of the parts herein shown may be made within the scope of my invention, as set forth in the appended claims.

I claim:

1. In combination, a glass furnace having a partition wall for dividing the furnace into a glass melting chamber and a glass refining chamber, a burner for heating said furnace, means for conducting air through the furnace wall to preheat the air and for thereafter delivering said air to the burner, and means for causing the gases of combustion from the burner to circulate through the furnace chambers.

2. In combination, a glass furnace, a partition wall therein containing passages for the circulation of air, a burner for heating said furnace, and means for conducting air through said partition wall and thence to said burner.

3. In combination, a glass furnace, a feeder adapted to receive glass from said furnace, a burner for heating said furnace, and means for causing gases of combustion from said burner to traverse said furnace in a direction counter to the direction of movement of glass through said furnace, and for delivering a portion of said gases to said feeder.

4. In combination, a glass furnace, a leer associated with the furnace, a feeder adapted to receive glass from said furnace, a burner for heating said furnace, and means for causing gases of combustion from said burner to traverse said furnace in a direction counter to the direction of movement of glass through said furnace, for delivering said gases to said leer, and for delivering a portion of said gases to said feeder.

5. In combination, a glass furnace, a partition wall dividing said furnace into a melting portion and a refining portion, means for admitting batch to said melting portion of the furnace, a burner arranged to project flame into the refining portion of said furnace, an opening in said partition wall to admit gases of combustion from the refining portion to the melting portion of said furnace, and means for establishing circulation of combustion gases from said burner through said furnace.

6. In combination, a glass furnace, a partition wall dividing said furnace into a melting portion and a refining portion, means for admitting batch to said melting portion of the furnace, a burner arranged to project flame into the refining portion of said furnace, an opening in said partition wall to admit gases of combustion from the refining portion to the melting portion of said furnace, a leer associated with said furnace, a channel connecting said furnace and said leer, and a stack associated with the said leer for establishing a current of combustion gases from said burner through said furnace and through said leer.

7. In combination, a glass furnace, a partition wall dividing said furnace into a melting portion and a refining portion, a feeder adapted to receive glass from the refining portion of said furnace, a burner for projecting gases of combustion into the refining portion of said furnace, a channel within said partition wall, and means for forcing air for combustion through said channel and thence to said burner.

8. In combination, a glass furnace, a partition wall dividing said furnace into a melting portion and a refining portion, a feeder adapted to receive glass from the refining portion of said furnace, a burner for projecting gases of combustion into the refining portion of said furnace, a channel within said partition wall, a leer associated with said furnace, a channel connecting said furnace and said leer, and a stack associated with said leer for establishing a current of combustion gases through said furnace, said feeder, said channel and said leer.

9. A glass melting furnace comprising a substantially U shaped body portion, a partition wall dividing the furnace into a glass melting chamber and a glass refining chamber, said partition wall provided with an opening in its upper portion for permitting the circulation of a heating medium through the chambers above the surface of the glass and another opening in the lower portion of said partition wall for permitting the passage of molten glass from one chamber to the other, a glass charging inlet in one chamber and a glass discharging outlet in the other chamber.

10. A glass melting furnace comprising a substantially U shaped body portion, a partition wall dividing the furnace into a glass melting chamber and a glass refining chamber, said partition wall provided with separate openings at one end thereof for permitting the passage of the molten material and the circulation of a heating medium from one chamber to the other, a glass charging inlet in one chamber, and a glass discharging outlet in the other chamber.

11. A glass melting furnace comprising a substantially U shaped body portion, a partition wall dividing the furnace into a glass melting chamber and a glass refining chamber, said partition wall provided with separate openings at one end thereof for permitting the passage of the molten material and the circulation of a heating medium from one chamber to the other, a glass charging inlet in one chamber and a glass discharge outlet in the other chamber, said inlet and outlet being at one end of the furnace.

12. A glass melting furnace comprising a substantially U shaped body portion, a partition wall dividing the furnace into a glass melting chamber and a glass refining chamber, said partition wall provided with separate openings at one end thereof for permitting the passage of the molten material and the circulation of a heating medium from one chamber to the other, means for supplying a heating medium to one chamber, means for discharging the medium from the other chamber, a glass charging inlet in one chamber and a glass discharging outlet in the other chamber.

13. A glass melting furnace comprising a substantially U shaped body portion, a partition wall dividing the furnace into a glass melting chamber and a glass refining chamber, said partition wall provided with separate openings at one end thereof for permitting the passage of the molten material and the circulation of a heating medium from one chamber to the other, an inlet for supplying a heating medium to one chamber, and an outlet for discharging the medium from the other chamber, a glass charging inlet in one chamber and a glass discharge outlet in the other chamber, the supply inlets for the molten material and the heating medium and the discharge outlets for the heating medium and the molten material being located at one end of the furnace.

14. A glass melting furnace comprising a substantially U shaped body portion, a partition wall dividing the furnace longitudinally into a glass melting chamber and a glass refining chamber, said partition wall provided with separate openings at one end thereof adjacent to the curved portion of the furnace, an inlet for supplying a heating medium to one chamber, and an outlet for discharging the medium from the other chamber, a glass charging inlet in one chamber and a glass discharge outlet in the other chamber, the supply inlets for the molten material and the heating medium and the discharge outlets for the heating medium and the molten material being located at one end of the furnace, whereby the glass and the heating medium is caused to travel the extent of each chamber.

15. A glass melting furnace comprising a substantially U shaped body portion, a partition wall dividing the furnace longitudinally into a glass melting chamber and a glass refining chamber, said partition wall provided with separate openings at one end thereof for permitting the passage of the molten material and the circulation of a heating medium from one chamber to the other, an inlet for supplying the heating medium to one chamber, and an outlet for discharging the medium from the other chamber, a glass charging inlet in one chamber and a glass discharge outlet in the other chamber, the supply inlets for the molten material and the heating medium and the discharge outlets for the heating medium and the molten material being located at one end of the furnace and arranged to cause the glass and the heating medium to flow in opposite directions while passing through the chambers.

16. A glass melting furnace comprising a substantially rectangular body portion, a partition wall dividing the furnace into a glass melting chamber and a glass refining chamber, said partition wall provided with separate openings at one end thereof for permitting the passage of the molten material and the circulation of a heating medium from one chamber to the other, a glass charging inlet in the melting chamber, a forehearth communicating with the refining chamber, and means for directing a portion of the heating medium along the surface of the glass in the forehearth counter to the flow of glass therein.

17. A glass melting furnace comprising a substantially rectangular body portion, a partition wall dividing the furnace into a glass melting chamber and a glass refining chamber, said partition wall provided with separate openings at one end thereof for permitting the passage of the molten material and the circulation of a heating medium from one chamber to the other, a glass charging inlet in the melting chamber, a forehearth communicating with the refining chamber and having a glass discharge outlet therein, a glass feeding implement operatively associated with the outlet, and means for directing a portion of the heating medium around the implement and along the surface of the glass counter to the flow of glass in the forehearth.

18. A glass melting furnace comprising a substantially U shaped body portion, a partition wall dividing the furnace into a glass melting chamber and a glass refining chamber, said partition wall provided with separate openings at the end thereof adjacent to the curved portion of the furnace for permitting the passage of the molten material and the circulation of a heating medium from one chamber to the other, a glass charging inlet in one chamber and a glass discharging outlet in the other chamber.

19. In combination, a glass furnace comprising a melting chamber, a refining chamber and a partition wall between said chambers, a feeder forehearth adapted to receive molten glass from the refining chamber of the furnace, means for projecting a heating medium into the refining chamber, and means for circulating such heating medium through the refining chamber, thence to the melting chamber and thence to the feeder forehearth.

Signed at London this 29 day of April, 1925.

JULIUS H. O. BUNGE.